United States Patent
Sumioka

(10) Patent No.: US 11,404,977 B2
(45) Date of Patent: Aug. 2, 2022

(54) CONTROL METHOD FOR VIBRATION TYPE ACTUATOR INCLUDING VIBRATOR AND CONTACT BODY MOVING RELATIVE TO EACH OTHER, DRIVE CONTROL DEVICE, VIBRATION TYPE DRIVE DEVICE, AND APPARATUS

(71) Applicant: CANON KABUSHIKI KAISHA, Tokyo (JP)

(72) Inventor: Jun Sumioka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 181 days.

(21) Appl. No.: 16/584,316

(22) Filed: Sep. 26, 2019

(65) Prior Publication Data

US 2020/0106372 A1    Apr. 2, 2020

(30) Foreign Application Priority Data

Sep. 27, 2018    (JP) .............................. JP2018-182377

(51) Int. Cl.
*H02N 2/02*    (2006.01)
*H02N 2/00*    (2006.01)
*H02N 2/14*    (2006.01)

(52) U.S. Cl.
CPC ............. *H02N 2/026* (2013.01); *H02N 2/008* (2013.01); *H02N 2/0015* (2013.01); *H02N 2/14* (2013.01)

(58) Field of Classification Search
CPC ...... H02N 2/026; H02N 2/008; H02N 2/0015; H02N 2/14; H02N 2/06
See application file for complete search history.

(56) References Cited

U.S. PATENT DOCUMENTS

| 7,960,895 B2 * | 6/2011 | Adachi | H02N 2/14 310/317 |
| 9,184,677 B2 * | 11/2015 | Ashizawa | H02N 2/062 |

(Continued)

FOREIGN PATENT DOCUMENTS

| JP | 2001-157473 A | 6/2001 |
| JP | 2016-144262 A | 8/2016 |
| JP | 2017-028933 A | 2/2017 |

OTHER PUBLICATIONS

Extended European Search Report dated Jan. 28, 2020, in European Patent Application No. 19199117.3.

(Continued)

*Primary Examiner* — Emily P Pham
(74) *Attorney, Agent, or Firm* — Venable LLP

(57) ABSTRACT

A vibration type drive device capable of maintaining stable drive performance and controllability includes a vibration type actuator comprising a vibrator and a contact body, and a drive control device. The drive control device applies two-phase alternating current voltages to the energy conversion element of the vibrator by a drive portion, converts a control amount of feedback control based on the relative position/speed into a phase difference between the two-phase alternating current voltages, and outputs the phase difference to the drive portion by using, for the relative movement, a phase difference of a first or second quadrant in a coordinate system (in a first direction) and a phase difference of a third or fourth quadrant (in a second direction), with θ representing the phase difference, SIN θ corresponding to the vertical axis, and COS θ corresponding to the horizontal axis in the coordinate system.

12 Claims, 16 Drawing Sheets

(56) References Cited

U.S. PATENT DOCUMENTS

| | | |
|---|---|---|
| 9,843,276 B2 | 12/2017 | Morita et al. |
| 10,355,621 B2 | 7/2019 | Sumioka |
| 2004/0262925 A1* | 12/2004 | Seki .................. H02N 2/142 |
| | | 290/40 A |
| 2007/0108870 A1 | 5/2007 | Atsuta |
| 2008/0278032 A1 | 11/2008 | Adachi et al. |
| 2012/0177354 A1 | 7/2012 | Ashizawa et al. |
| 2012/0274243 A1 | 11/2012 | Sumioka |
| 2019/0280622 A1 | 9/2019 | Sumioka |

OTHER PUBLICATIONS

Office Action dated May 24, 2022, in Japanese Patent Application No. 2018-182377.

* cited by examiner

FIG. 2A
FIG. 2B
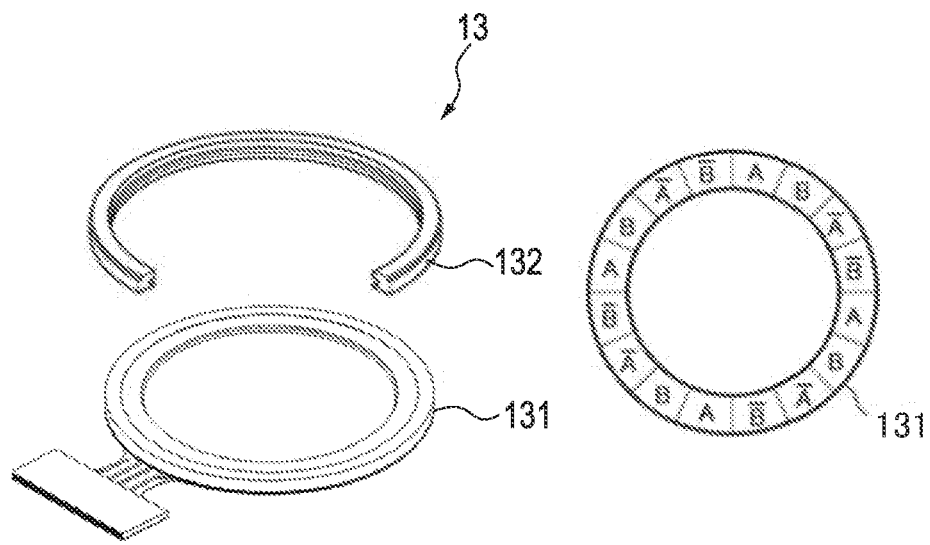
FIG. 2C
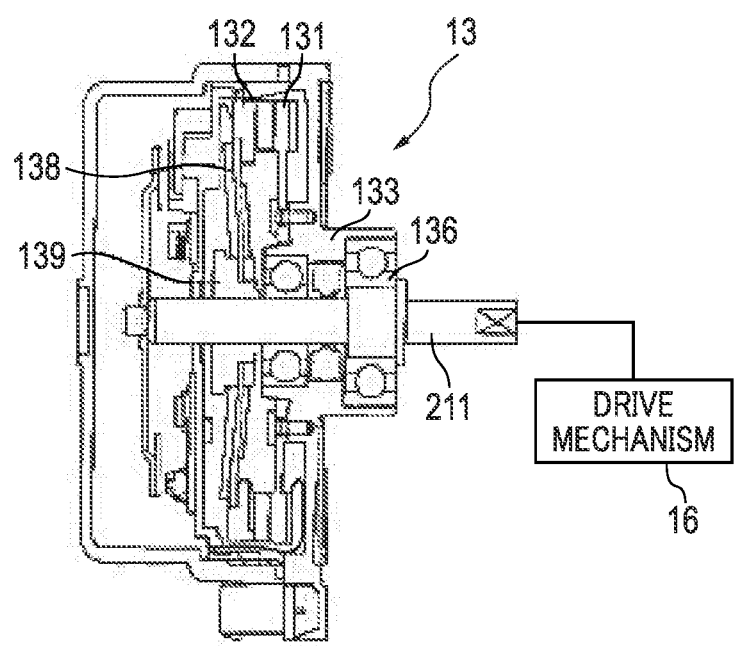

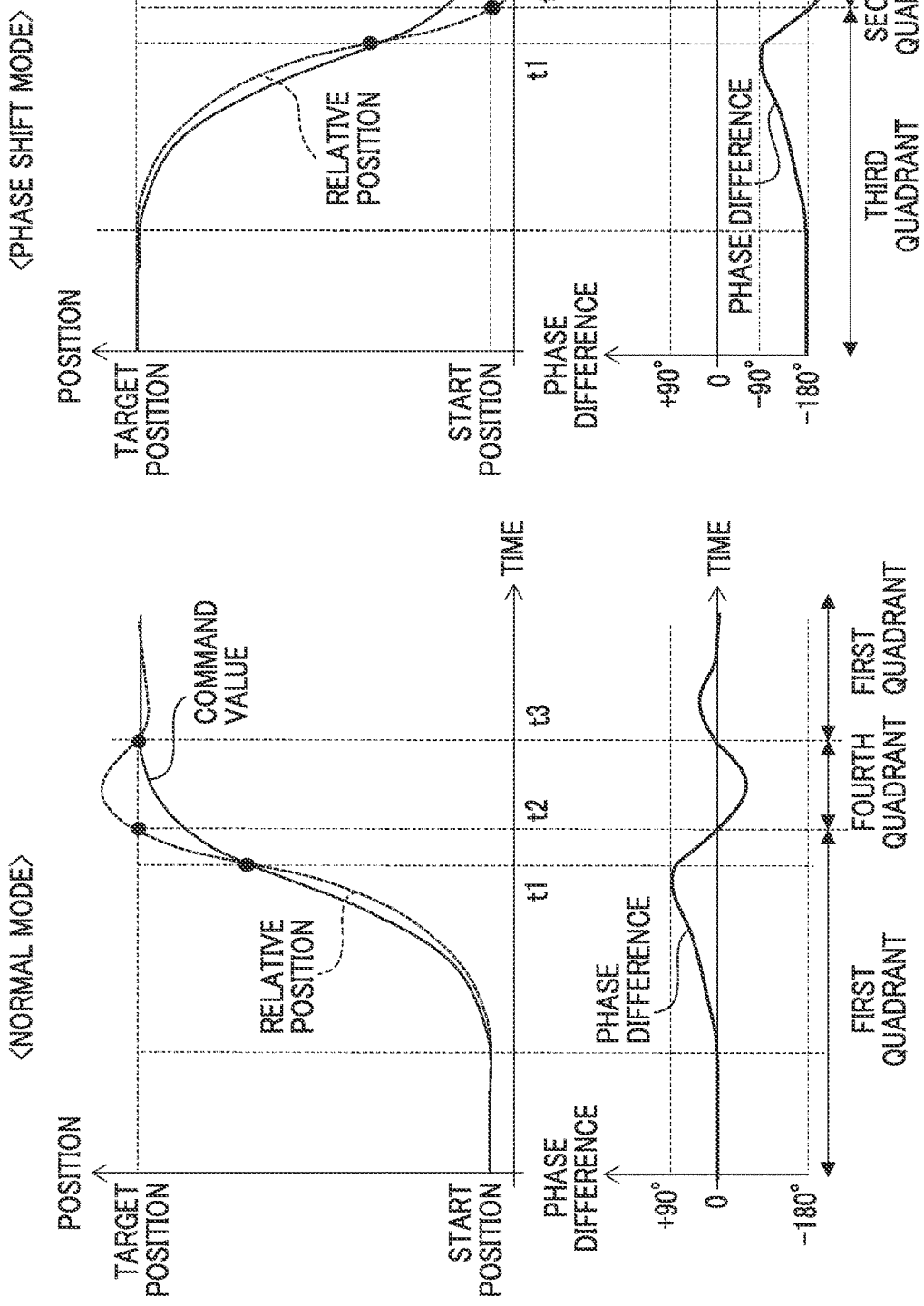

CONTROL METHOD FOR VIBRATION TYPE ACTUATOR INCLUDING VIBRATOR AND CONTACT BODY MOVING RELATIVE TO EACH OTHER, DRIVE CONTROL DEVICE, VIBRATION TYPE DRIVE DEVICE, AND APPARATUS

BACKGROUND OF THE INVENTION

Field of the Invention

The present invention relates to a control method for a vibration type actuator including a vibrator and a contact body moving relative to each other, a drive control device, a vibration type drive device including the vibration type actuator, and an apparatus.

Description of the Related Art

A vibration type actuator is a non-electromagnetic drive actuator that causes vibration in a vibrator by applying alternating current voltages to an electrical-mechanical energy conversion element such as a piezoelectric element constituting the vibrator and outputs vibration energy as mechanical motion. For example, Japanese Laid-Open Patent Publication (kokai) No. 2001-157473 describes a vibration type actuator that excites progressive vibration (hereinafter, referred to as a "traveling wave") in the vibrator and frictionally drives a contact body in contact with the vibrator.

The vibration type actuator described in Japanese Laid-Open Patent Publication (kokai) No. 2001-157473 has a structure in which the vibrator has an annular elastic body, a projection group having a comb-teeth shape is formed on one side of the elastic body in an axial direction (thickness direction), and an annular contact body is disposed so as to be in contact with a friction material bonded to an upper surface of each projection. An annular piezoelectric element is bonded to the other side of the elastic body in the axial direction, and a pattern electrode is formed on the piezoelectric element. The pattern electrode is equally divided into four times the order so as to correspond to the order of vibration modes excited in an annular part of the vibrator, and a substantially sinusoidal alternating current voltage of which a phase is shifted by 90° with time is sequentially applied to each electrode. In this case, when alternating current voltages having frequencies near natural frequencies of the vibration modes to be excited are applied to the pattern electrode, the elastic body resonates by a bending moment to be applied to the elastic body through the expansion and contraction of the piezoelectric element. Since the vibration modes to be excited in the vibrator are the same but phases are different, the vibrations are combined, and thus, the traveling waves are formed.

When the vibration type actuator is driven, it is possible to control a speed at which the vibrator and the contact body move relative to each other by adjusting the frequencies, amplitudes, and phase differences of the alternating current voltages to be applied to the piezoelectric element. Examples of a method of decreasing a speed of the relative movement while maintaining a predetermined vibration amplitude include a method of generating a standing wave by reducing a phase difference between two-phase alternating current signals from 90°. According to such control, it is possible to perform high-accuracy control with no deadband, and thus, it is possible to perform a stable operation.

However, in the technology described in Japanese Laid-Open Patent Publication (kokai) No. 2001-157473, portions at which vibration amplitudes are different depending on locations are distributed on a contact surface of the contact body to the vibrator due to the use for a long period of time, and thus, there is a problem that a friction state becomes non-uniform. Since the non-uniformity of the friction state causes a difference in wear rate of a friction surface, the flatness of the friction surface is declined, and thus, drive performance or controllability is declined. Since maximum displacement positions of the vibration amplitudes are not changed, the wear progresses at a specific portion of the vibrator, and thus, a contact surface pressure of the contact body to the vibrator becomes uneven. Accordingly, the drive performance or the controllability is declined. If the contact surface of the contact body to the vibrator has irregularities, rotation synchronized with a relative rotational operation of the contact body to the vibrator is uneven, and thus, there is a concern that rotation accuracy would be declined.

SUMMARY OF THE INVENTION

The present invention provides a control method for a vibration type actuator, a drive control device, a vibration type drive device, and an apparatus which are capable of maintaining stable drive performance and controllability even in a case where the vibration type actuator is used over a long period of time.

Accordingly, the present invention provides a vibration type drive device comprising a vibration type actuator that comprises a vibrator and a contact body which move relative to each other, and a drive control device configured to control driving of the vibration type actuator, wherein the vibrator has an electrical-mechanical energy conversion element, and the drive control device comprises a drive portion configured to apply two-phase alternating current voltages to the electrical-mechanical energy conversion element, a detection unit configured to detect a relative position or a relative speed between the vibrator and the contact body, a conversion unit configured to convert a control amount of feedback control based on the relative position or the relative speed into a phase difference between the two-phase alternating current voltages, and an output unit configured to output the phase difference to the drive portion by using, for driving of the relative movement in a first direction, a phase difference of a first quadrant or a second quadrant at a coordinate, and by using, for driving in a second direction opposite to the first direction, a phase difference of a third quadrant or a fourth quadrant at the coordinate, wherein the phase difference is indicated by θ, and SIN θ is taken on a vertical axis and COS θ is taken on a horizontal axis in the coordinate.

According to the present invention, it is possible to maintain stable drive performance and controllability even in a case where a vibration type actuator is used for a long period of time.

Further features of the present invention will become apparent from the following description of exemplary embodiments with reference to the attached drawings.

BRIEF DESCRIPTION OF THE DRAWINGS

FIGS. 2A to 2C are diagrams for describing a configuration of a vibration type actuator.

FIGS. 14A and 14B are graphs showing a relationship between a relative position, a phase difference, and a time in a drive control method according to the second embodiment.

DESCRIPTION OF THE EMBODIMENTS

The present invention will now be described in detail below with reference to the accompanying drawings showing embodiments thereof. In the following description, it is assumed that a vibration type drive device includes a vibration type actuator and a drive control device that controls the vibration type actuator.

Figure 1:
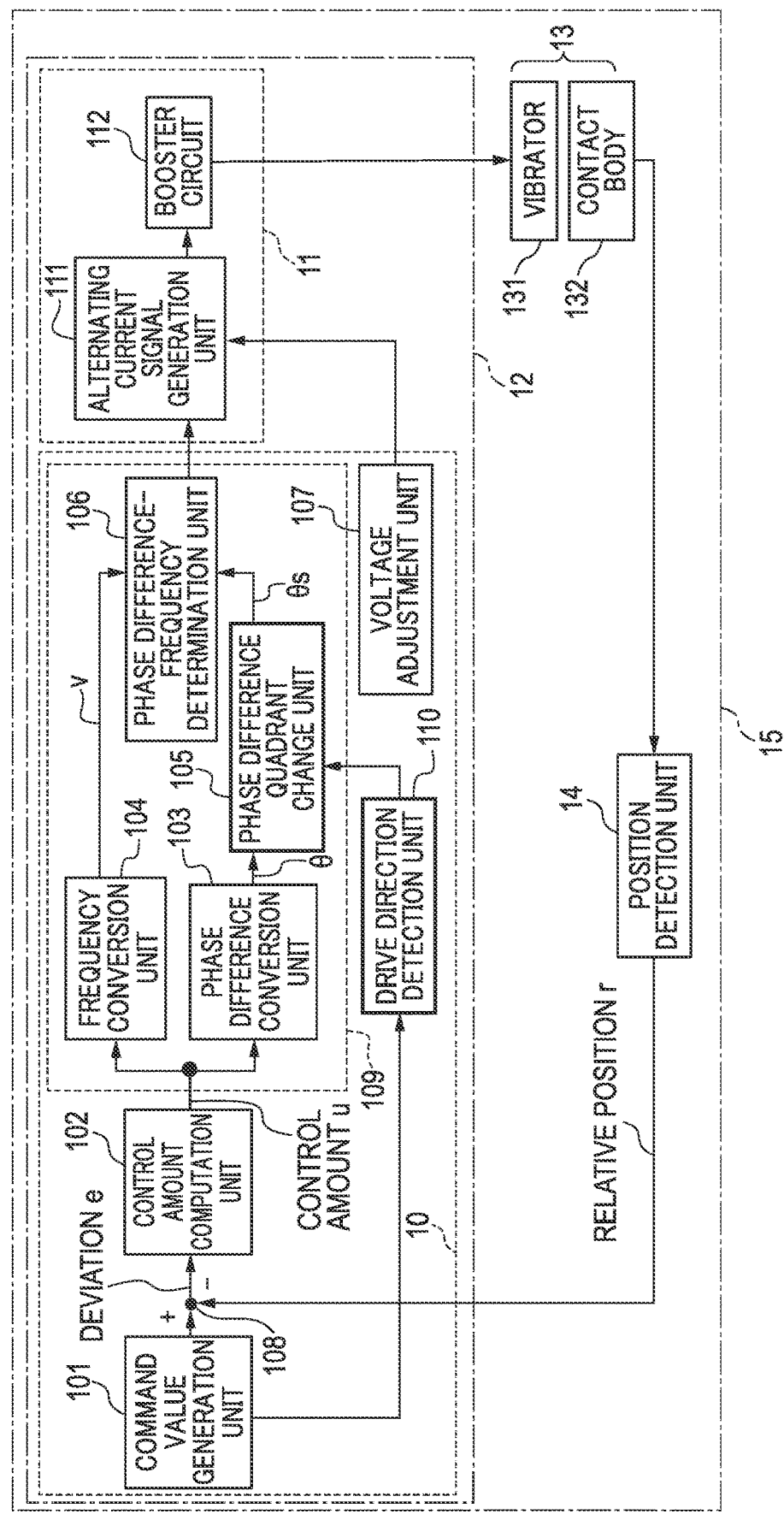
FIG. 1 is a block diagram of a vibration type drive device according to an embodiment of the present invention.

FIG. 1 is a block diagram showing a schematic configuration of a vibration type drive device 15 according to an embodiment of the present invention. The vibration type drive device 15 includes a drive control device 12, a vibration type actuator 13, and a position detection unit 14. The drive control device 12 includes a control unit 10 and a drive portion 11. The control unit 10 includes a command value generation unit 101, a control amount computation unit 102, a voltage adjustment unit 107, a subtractor 108, a phase difference-frequency control unit 109, and a drive direction detection unit 110. The phase difference-frequency control unit 109 includes a phase difference conversion unit 103, a frequency conversion unit 104, a phase difference quadrant change unit 105, and a phase difference-frequency determination unit 106. The drive portion 11 includes an alternating current signal generation unit 111 and a booster circuit 112. The vibration type actuator 13 includes a vibrator 131 and a contact body 132. The position detection unit 14 detects a relative position r between the vibrator 131 and the contact body 132. The position detection unit 14 may be included in the drive control device 12.

The control unit 10 generates a signal including information for controlling driving of the vibrator 131. Specifically, the command value generation unit 101 generates a command value for each occurrence of the relative position r (hereinafter, simply referred to as a "command value") at the time of driving the vibration type actuator 13 according to a predetermined speed profile, and outputs the generated command value to the subtractor 108. In this case, the command value generation unit 101 generates, for example, one command value for each control sampling, and outputs the generated command value. The control sampling indicates, for example, as shown in FIG. 1, one cycle from the obtainment of a deviation e to immediately before the obtainment of the deviation e is started again via the input of alternating current voltages to the vibrator 131 and the detection of the relative position r performed by the position detection unit 14. Feedback control of the driving (relative position r) of the vibration type actuator 13 is performed on this cycle. The generation of the command value is not limited to a method for obtaining the command value based on the relative position r. A method for detecting a relative speed between the vibrator 131 and the contact body 132 and obtaining the command value from the detected relative speed may be used.

As will be described below, in the present embodiment, a rotation drive type that drives the contact body 132 to be rotated is used as the vibration type actuator 13. Thus, in the present embodiment, the relative position r indicates a rotation angle of the contact body 132 with respect to the vibrator 131. The relative speed between the vibrator 131 and the contact body 132 is a rotational speed of the contact body 132 with respect to the vibrator 131. In the following description, the relative speed between the vibrator 131 and the contact body 132 is referred to as the "rotational speed of the contact body 132". A drive direction of the contact body 132 is either a clockwise direction (CW direction (first direction)) or a counterclockwise direction (CCW direction (second direction)). The command value generation unit 101 outputs the generated command value to the drive direction detection unit 110. The drive direction detection unit 110 detects the drive direction (CW direction or CCW direction) from the command value, and outputs the detected drive direction to the phase difference quadrant change unit 105.

The subtractor 108 calculates the deviation e by computing a difference between the relative position r detected by the position detection unit 14 and the command value generated by the command value generation unit 101. The control amount computation unit 102 computes a control amount u by using the deviation e by a PID compensator or the like, and outputs the computed control amount to the phase difference-frequency control unit 109. It should be noted that the PID compensator adds the outputs of the compensator having proportional (P), integral (I), and derivative (D) functions, and is generally used to construct a stable control system with high accuracy by compensating for a phase delay or gain of a control target.

In the phase difference-frequency control unit 109, the phase difference conversion unit 103 and the frequency conversion unit 104 convert the control amount u into a phase difference θ and a frequency v which are operation parameters of the alternating current voltages to be applied to a piezoelectric element of the vibrator 131. The frequency conversion unit 104 outputs the generated frequency v to the phase difference-frequency determination unit 106. The phase difference conversion unit 103 outputs the generated phase difference θ to the phase difference quadrant change unit 105.

Information indicating the drive direction of the contact body 132 is input to the phase difference quadrant change unit 105 from the drive direction detection unit 110. The phase difference quadrant change unit 105 performs phase difference shift to be described below as occasion demands by using the phase difference θ and the information regarding the drive direction obtained from the drive direction detection unit 110, and outputs, as a phase difference θs, the phase difference to the phase difference-frequency determination unit 106. The phase difference-frequency determination unit 106 controls the rotational speed of the contact body 132 by using the frequency v and the phase difference θs.

The alternating current signal generation unit 111 generates two-phase alternating current signals (to be described in detail) based on the phase difference θs and the frequency v from the phase difference-frequency determination unit 106 and pulse width information from the voltage adjustment unit 107. The booster circuit 112 generates alternating current voltages obtained by boosting the alternating current signals from the alternating current signal generation unit 111 to a desired voltage value, and applies the generated alternating current voltages to the piezoelectric element of the vibrator 131. Accordingly, predetermined vibration is excited in the vibrator 131, and thrust is applied to the contact body 132 from the vibrator 131. Therefore, the vibrator 131 and the contact body 132 move relative to each other.

The position detection unit 14 includes a position sensor (not shown) attached to the contact body 132 or the vibrator 131. The relative position r detected by the position sensor is fed back to the control amount computation unit 102, and thus, the feedback control of the driving of the vibration type actuator 13 is performed so as to follow the command value. Although the drive control device 12 in the present embodiment has the configuration in which the piezoelectric element included in the vibrator 131 is driven with two phases, the present invention is not limited thereto. The drive control device can also be applied to the driving of a vibration type actuator including a vibrator that drives the piezoelectric element with two or more phases.

It should be noted that the control unit 10 is constituted by, for example, a digital device such as a CPU, a PLD (including ASIC), or an element such as an A/D converter. In the drive portion 11, the alternating current signal generation unit 111 is constituted by, for example, a CPU, a function generator, or a switching circuit. The booster circuit 112 is constituted by, for example, a coil or a transformer. The control unit 10 and the drive portion 11 may not be constituted by one element or circuit. The control unit and the drive portion may be constituted by a plurality of elements or circuits, and each processing may be performed by any of the elements or circuits.

FIGS. 2A to 2C are diagrams for describing a schematic configuration of the vibration type actuator 13. FIG. 2A is a perspective view of the vibrator 131 and the contact body 132 constituting the vibration type actuator 13. Both of the vibrator 131 and the contact body 132 have an annular shape, and are coaxially arranged. The contact body 132 is in contact with the vibrator 131 in an axial direction in a state in which the contact body is rotatably supported about an axis. The vibrator 131 includes an elastic body which has an annular shape and is in contact with the contact body 132. The vibrator 131 includes an annular piezoelectric element (electrical-mechanical energy conversion element) bonded to an opposite surface to a surface, of the elastic body, in contact with the contact body 132. It should be noted that the contact body 132 of which a part is cut out is shown in FIG. 2A.

FIG. 2B is a plan view showing an electrode pattern of the piezoelectric element constituting the vibrator 131. The electrode pattern of the piezoelectric element is formed such that the number of traveling waves generated in the vibrator 131 is four waves during one rotation. However, the number of traveling waves is not limited to four waves. In FIG. 2B, "A" indicates an A phase, a letter with "–" above "A" indicates an A' phase, "B" indicates a B phase, and a letter with "–" above "B" indicates a B' phase.

FIG. 2C is a cross-sectional view showing a schematic configuration of the vibration type actuator 13. In the vibration type actuator 13, the vibrator 131 is fixed to a housing 133 by a screw or the like, and an output shaft 211 is rotatably supported by a ball bearing 136 on the housing 133. A pressurizing spring 138 pressurizes the contact body 132 against the vibrator 131, and transmits the rotation of the contact body 132 to the output shaft 211. The alternating current voltages are applied to the piezoelectric element of the vibrator 131 by using the drive control device 12. As a result, the contact body 132 rotates, and thus, a rotation position of the contact body 132 with respect to the vibrator 131 is relatively changed. When the contact body 132 rotates, the output shaft 211 rotates through the pressurizing spring 138. The output shaft 211 is coupled to a drive mechanism 16 of various devices or pieces of equipment through a not-shown mechanism. Thus, the drive mechanism 16 operates by receiving a rotation output of the output shaft 211. It should be noted that the vibration type actuator capable of performing drive control by the drive control device 12 is not limited to the configuration shown in FIG. 2C.

Figure 3:
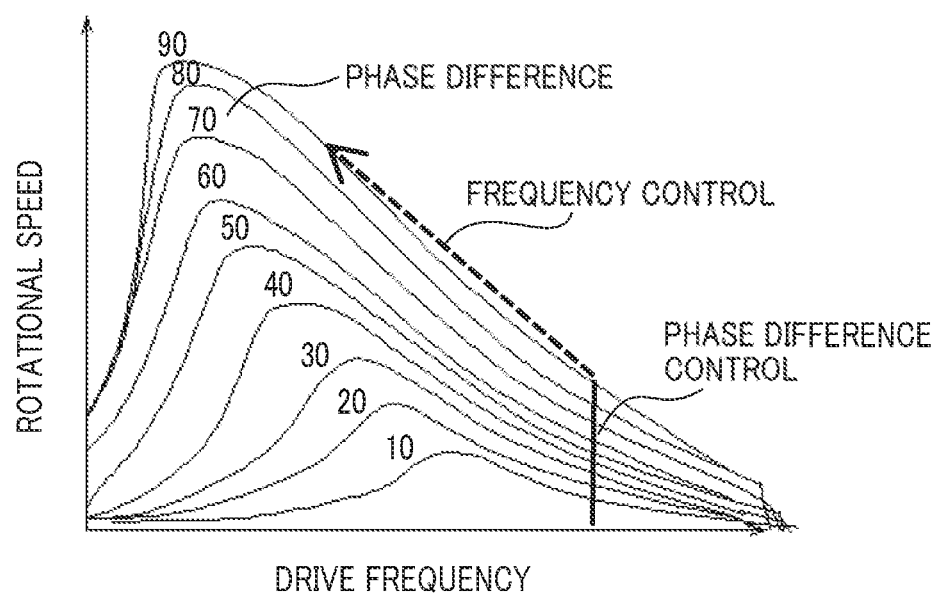
FIG. 3 is a diagram showing a relationship between a drive frequency, a phase difference, and a rotational speed of a contact body in the vibration type actuator.

FIG. 3 is a diagram showing a relationship between the drive frequency and phase difference in the vibration type drive device 15 and the rotational speed of the contact body 132 in the vibration type actuator 13. Phase difference control for changing the phase difference is performed in a region (low-speed region) in which the rotational speed is low, and frequency control for changing the drive frequency is performed in a region (high-speed region) in which the rotational speed is high. Switching is performed between the phase difference control and the frequency control according to a feedback control amount. In the phase difference control during low-speed driving, the frequency is fixed, and the phase difference is operated in a range of 0° to 90°. In the frequency control during high-speed driving, the phase difference is fixed to 90°, and the frequency is operated. It should be noted that "degree" which is a unit indicating the phase difference is expressed by "°" in the present description.

According to the phase difference control, it is possible to perform stable driving in the low-speed region compared to the frequency control. Meanwhile, as will be described below with reference to FIGS. 4A and 4B, with the phase difference control, since amplitude unevenness is caused in the vibrator 131, there is a disadvantage in restraining wear. In contrast, since the amplitude unevenness is hardly caused in the vibrator 131, the frequency control has an advantage in restraining the wear.

Figure 4A:
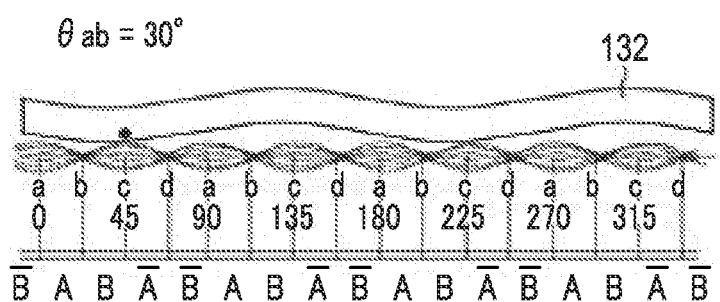
FIGS. 4A and 4B are diagrams showing a contact state between the contact body and a vibrator, and a drive state.
Figure 4B:
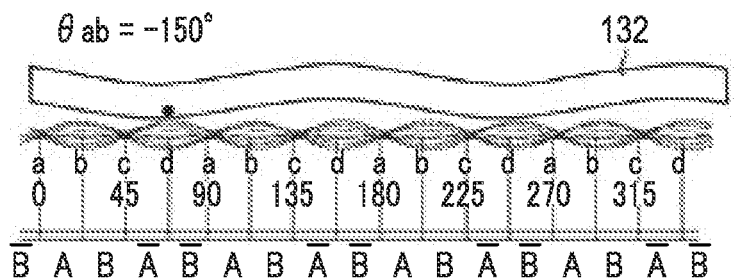

A principle of changing a quadrant by the phase difference shift which is a characteristic control in the drive control device 12 will be described in conjunction with an example of a case where a phase difference between two-phase drive signals to be applied to an A phase and a B phase is shifted. FIGS. 4A and 4B are diagrams showing a contact state between the vibrator 131 and the contact body 132 in the vibration type actuator 13 and a drive state of the vibration type actuator 13. FIG. 4A shows a state in which the phase difference is set to 30° (first quadrant) and the vibration type actuator 13 is driven at a low speed. In this case, maximum displacements (positions a and positions c in the figure) and minimum displacements (positions b and positions d in the figure) of vibration amplitudes occur at eight locations during one rotation (range of 0 deg to 360 deg). Specifically, rotation positions of 0 deg, 45 deg, 90 deg, 135 deg, 180 deg, . . . are the maximum displacement positions (positions a and positions c). It should be noted that "degree" which is a unit indicating each rotation position of the vibrator 131 is expressed by "deg" in the present description. Each rotation position of the vibrator 131 can be expressed by 0 deg to 360 deg in a circumferential direction.

In this case, the rotational speed of the contact body 132 is controlled so as to be maintained at a constant speed. Thus, there is a difference in wear amount between the maximum displacement positions and the minimum displacement positions of the vibration in the vibrator 131 as a drive time becomes longer. This is because there is a difference in slippage amount depending on the magnitude of the vibration at a contact part between the vibrator 131 and the contact body 132. Accordingly, there is a difference in wear amount between the maximum displacement positions and the minimum displacement positions, and thus, uneven wear is caused in the vibrator 131. As a result, a favorable contact state is not maintained, and thus, drive performance is declined. It should be noted that the drive direction of the contact body 132 in the case of the phase difference −30° (fourth quadrant) is opposite to that in the case of the phase difference 30° (first quadrant) but the maximum displacement positions and the minimum displacement positions of the vibration are the same as those in the case of the phase difference 30° (first quadrant).

FIG. 4B shows a drive state when the phase difference 30° of the first quadrant is shifted to −150° of a third quadrant by only 180°. In this state, the drive direction of the contact body 132 is opposite to that in the case of FIG. 4A but the rotational speed is the same. The maximum displacement positions and the minimum displacement positions of the vibration are switched with respect to those in the case of FIG. 4A. That is, the positions a and the positions c which are the maximum displacement positions of the vibration amplitudes when the phase difference is 30° become the minimum displacement positions of the vibration amplitudes of the vibrator 131 when the phase difference is −150°. Specifically, when the phase difference is −150°, the rotation positions 0 deg, 45 deg, 90 deg, 135 deg, 180 deg, . . . become the minimum displacement positions.

As stated above, the phase difference between the alternating current voltages is adjusted, and thus, it is possible to switch the maximum displacement positions and the minimum displacement positions of the vibration caused in the vibrator 131 with each other. By the phase difference shift being periodically performed, the uneven wear of the vibrator 131 is reduced. As a result, it is possible to restrain the drive performance of the vibration type actuator 13 from being declined. It should be noted that a case where a shift amount of the phase difference is 180° has been described above.

Figure 5A:
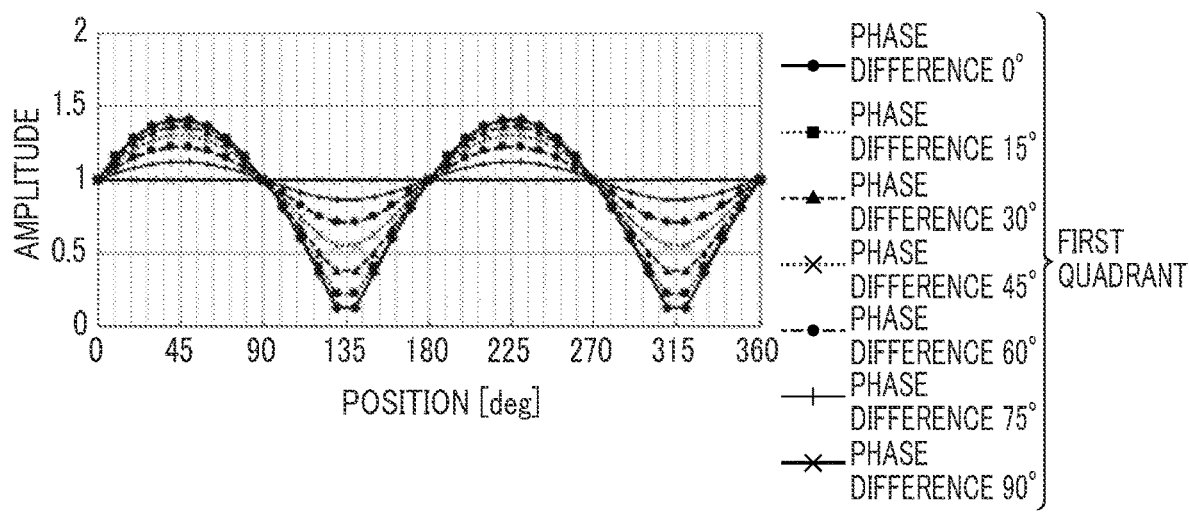
FIGS. 5A and 5B are diagrams for describing a relationship between a vibration amplitude and a phase difference between alternating current voltages.
Figure 5B:
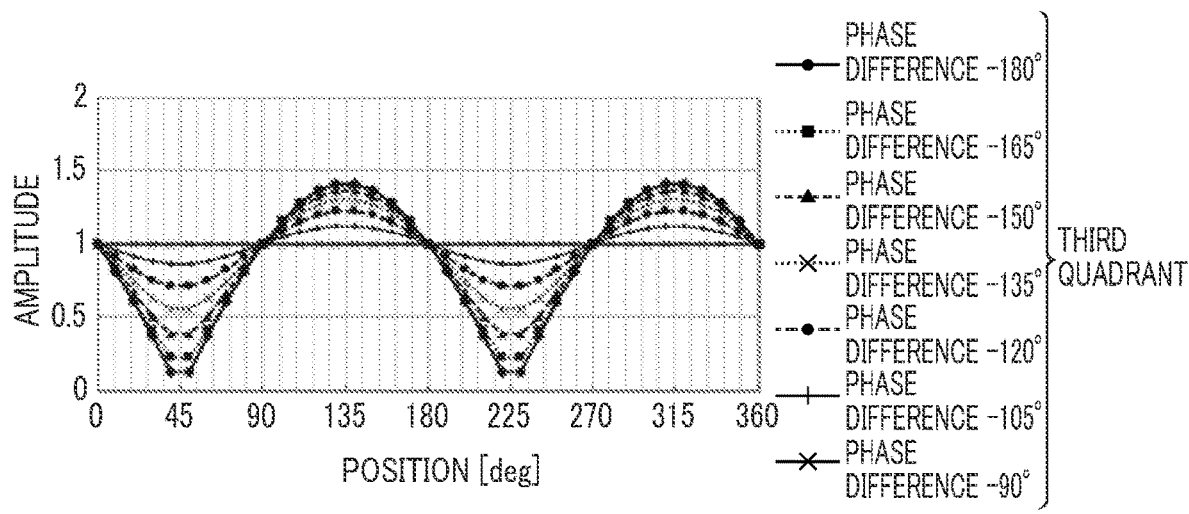

FIGS. 5A and 5B are diagrams showing a relationship between the phase difference between the alternating current voltages and the vibration amplitude caused in the vibrator 131. FIG. 5A represents the vibration amplitudes at the positions on of the vibrator 131 when the phase difference between the alternating current voltages is set to a predetermined value in a range of 0° to 90° of the first quadrant.

When the phase difference is 0°, a standing wave of which a traveling wave component is zero (0) is generated. That is, vibration only in a direction in which the vibrator 131 and the contact body 132 are pressurized is caused, and a difference between the maximum displacements and the minimum displacements is the largest. As the phase difference between the alternating current voltages becomes larger, the difference between the maximum displacements and the minimum displacements becomes smaller. The vibration amplitudes are equal at all positions of the vibrator 131 in the case of the phase difference of 90°. That is, an ideal traveling wave is generated, and the vibration amplitudes become constant at all the positions of the vibrator 131.

FIG. 5B represents the vibration amplitudes at the positions of the vibrator 131 when the phase difference between the alternating current voltages is set to a predetermined value in a range of −180° to −90° of the third quadrant. In FIG. 5B, the maximum displacement positions and the minimum displacement positions of the amplitudes of the standing waves are switched with respect to those in the case of FIG. 5A. Traveling direction of the traveling wave is opposite to that in the case of FIG. 5A. A standing wave is obtained in the case of the phase difference of −180°, and the difference between the maximum displacements and the minimum displacements of the vibration is the largest. The vibration amplitudes become constant in the case of the phase difference of −90°.

Figure 6A:
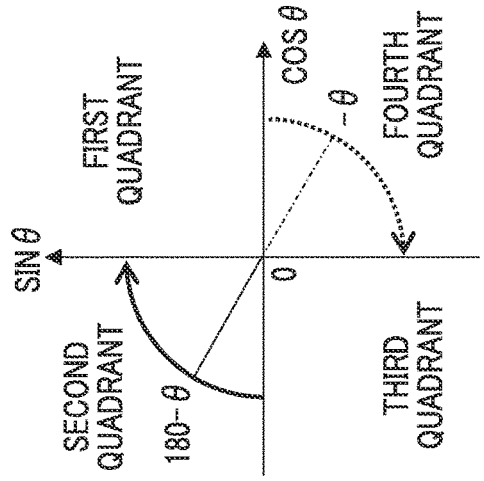
FIGS. 6A to 6C are diagrams showing comparison of phase difference control of the related art with phase difference control of a first embodiment.
Figure 6B:
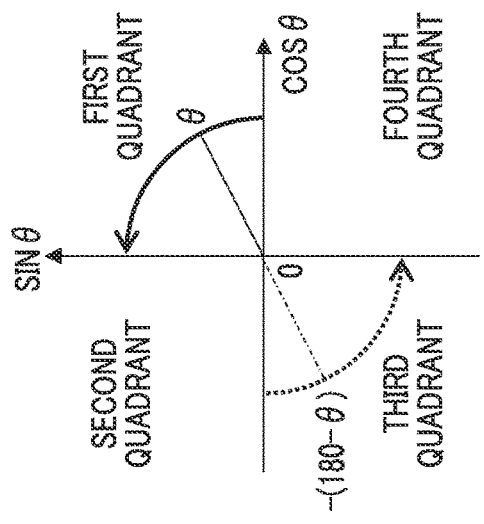
Figure 6C:
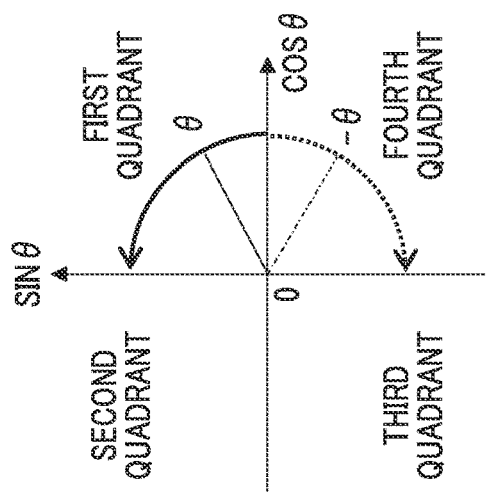

Next, a drive control method according to a first embodiment performed by the drive control device 12 will be described. FIGS. 6A to 6C are diagrams showing the comparison of phase difference control according to the related art with phase difference control (an operation of the phase difference quadrant change unit 105) according to the first embodiment. In FIGS. 6A to 6C, regarding the phase difference θ, the vibration amplitudes are schematically represented by coordinates in which COS θ and SIN θ are respectively taken on a horizontal axis and a vertical axis.

FIG. 6A is a diagram for describing the phase difference control of the related art. Regarding COS θ, the maximum displacement positions and the minimum displacement positions of the vibration are switched according to the sign of the phase difference, and regarding SIN θ, the drive direction of the contact body 132 is changed according to the sign of the phase difference. The phase difference θ is divided into four quadrants. In the related art, control is performed by using the first quadrant and the fourth quadrant. In this case, two quadrants are switched according to the drive directions (CW direction, CCW direction), but the maximum displacement positions and the minimum displacement positions of the vibration amplitudes are not changed.

FIG. 6B is a schematic diagram for describing an example of the phase difference control according to the first embodiment. In this example, the phase difference θ of the first quadrant is used as the phase difference θs (phase difference θs=θ) in the driving in the CW direction, and the phase difference θs=−(180−θ) of the third quadrant is used in the driving in the CCW direction. The phase difference θs=−(180−θ) is obtained by phase shifting of the phase difference θ, and the maximum displacement positions and the minimum displacement positions of the vibration amplitudes are switched between the first quadrant and the third quadrant. Thus, when the driving in the CW direction and the driving in the CCW direction are repeatedly performed, the maximum displacement positions and the minimum displacement positions of the vibration amplitudes are switched with each other according to the drive direction, and thus, it is possible to reduce the uneven wear in the vibrator 131.

FIG. 6C is a diagram for describing another example of the phase difference control according to the first embodiment. In this example, the phase difference θs=(180−θ) of the second quadrant obtained by the phase shifting is used in the driving in the CW direction, and the phase difference θs=−θ of the fourth quadrant is used in the driving in the CCW direction. As in the case of FIG. 6B, the maximum displacement positions and the minimum displacement positions of the vibration amplitudes are switched between the second quadrant and the fourth quadrant. Thus, when the driving in the CW direction and the driving in the CCW direction are repeatedly performed, the maximum displacement positions and the minimum displacement positions of the vibration amplitudes are switched with each other according to the drive direction, and thus, it is possible to reduce the uneven wear in the vibrator 131. It should be noted that either FIG. 6B or 6C may be used or the drive control methods of FIGS. 6B and 6C may be periodically switched to be used, in the present embodiment.

Figure 7A:
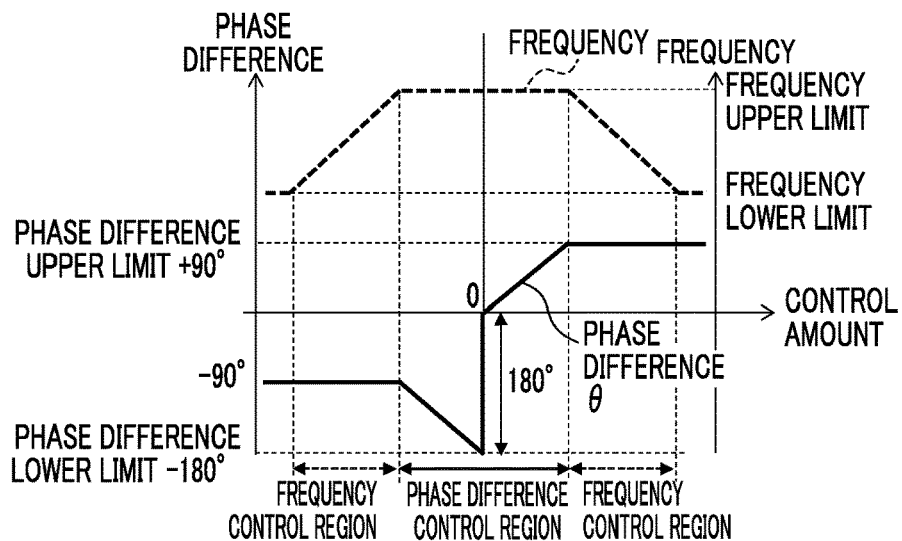
FIGS. 7A to 7D are diagrams for describing outputs of a phase difference-frequency determination unit.

FIGS. 7A to 7D are diagrams for describing outputs of the phase difference-frequency determination unit 106. FIG. 7A is a diagram showing outputs of the phase difference and the frequency based on the control amount in which the control amount is taken on a horizontal axis, the phase difference is taken on a left vertical axis, and the frequency is taken on a right vertical axis. A region in which an absolute value of the control amount is smaller than a predetermined value is a phase difference control region, and a region in which the absolute value of the control amount is larger than the predetermined value is a frequency control region. The control using the phase difference and the control using the frequency are switched according to the control amount. The method shown in FIG. 6B is applied to the phase difference control region. That is, the rotational speed of the contact body 132 is controlled by fixing the drive frequency to a frequency upper limit and changing the phase difference in the range of 0° to +90° of the first quadrant in the driving in the CW direction and changing the phase difference in the range of −180° to −90° of the third quadrant obtained by the phase shifting in the driving in the CCW direction. In the frequency control region, the rotational speed of the contact body 132 is controlled by fixing the phase difference to a lower limit or an upper limit and changing the drive frequency between a frequency upper limit and a frequency lower limit (for example, between 53 kHz and 51 kHz).

Figure 7B:
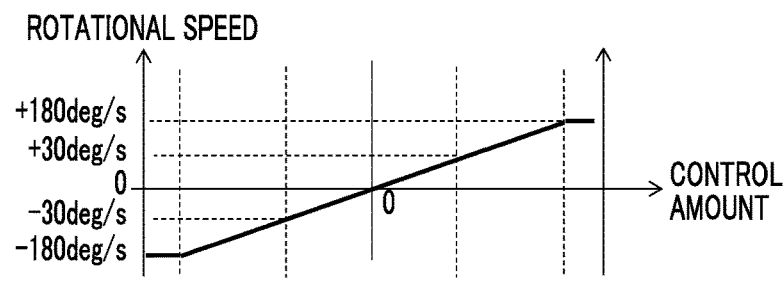

FIG. 7B shows the rotational speed of the contact body 132 based on the control amount in which a horizontal axis indicates the control amount and a vertical axis indicates the rotational speed of the contact body 132. It should be noted that a rotation angle per second which is a unit indicating the rotational speed of the contact body 132 is expressed by "deg/s" in the present description. The phase difference control is performed in a region (low-speed driving region) in which the rotational speed is −30 to +30 deg/s (5 rpm or less), and the frequency control is performed in the other region (high-speed driving region). It should be noted that the rotational speed is zero (0) when the phase difference is 0°, −180°, and +180°. Meanwhile, in the frequency control, control is performed such that the amplitudes of the traveling waves are changed. Through such control, the phase difference and the frequency are set such that the speed is as linear as possible over the control amount.

Figure 7C:
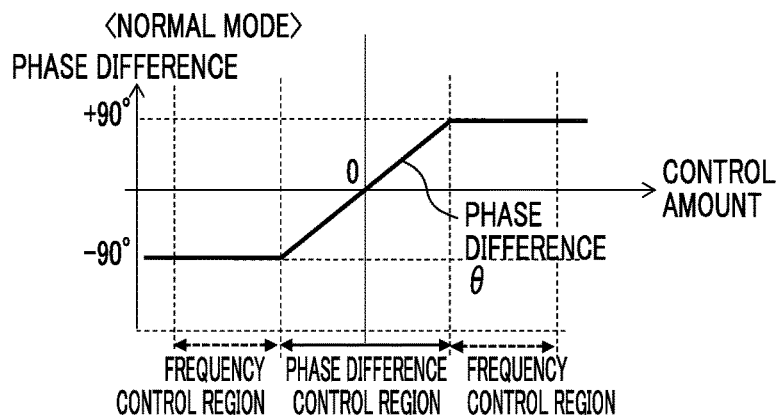
Figure 7D:
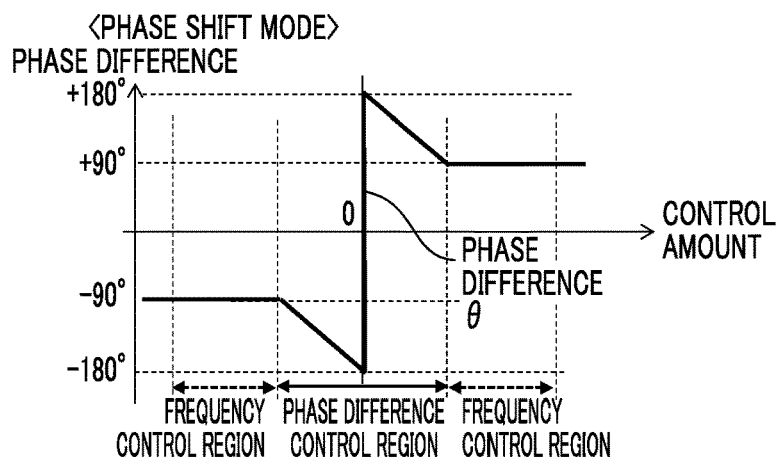

FIG. 7C is a diagram for describing phase difference control in a normal mode, and FIG. 7D is a diagram for describing phase difference control in a phase shift mode. It can be seen in the drive control method according to the first embodiment (FIG. 7A) that outputs obtained by combining an output in the normal mode when the control amount is positive and an output in the phase shift mode when the control amount is negative are used.

Figure 8:
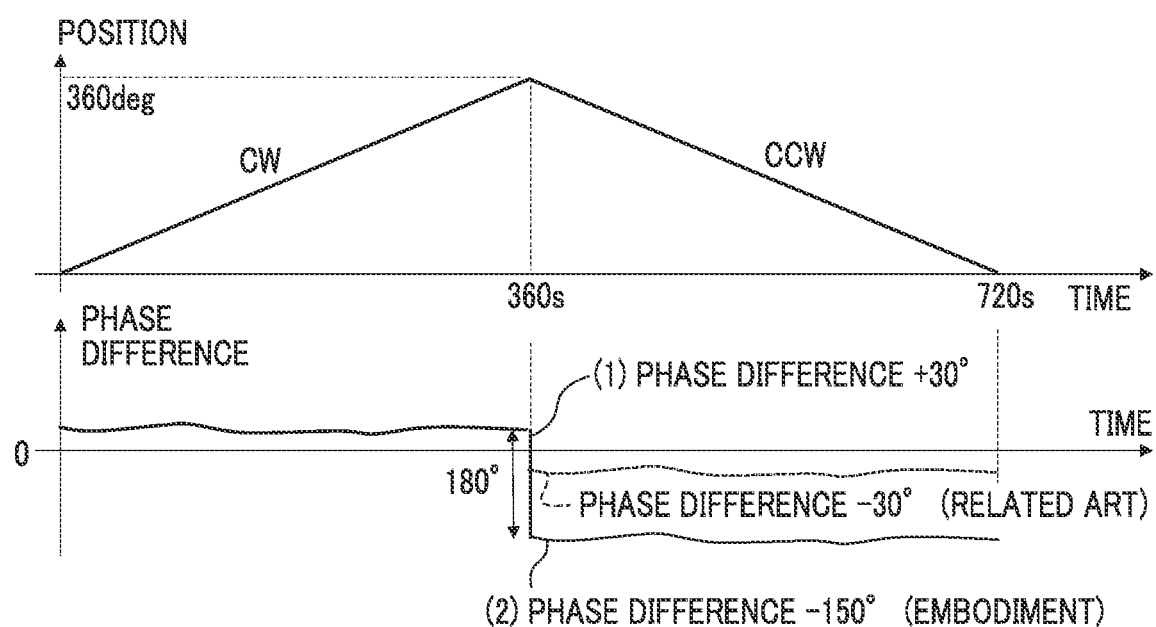
FIG. 8 is a schematic diagram showing a relationship between a phase difference and a drive direction during low-speed driving.

FIG. 8 is a schematic diagram showing a relationship between the drive direction and the phase difference during the low-speed driving (specifically, 1 deg/s) performed by the drive control device 12. The rotational speed of the contact body 132 is controlled with the phase difference in the range of 0° to 90° of the first quadrant in the CW direction and is controlled with the phase difference in the range of −180° to −90° of the third quadrant which is obtained by the phase shifting in the CCW direction. The phase difference is successively updated and gently changed such that the rotational speed of the contact body 132 is controlled to 1 deg/s (=0.2 rpm) during the driving. For example, assuming that an average value of the phase difference is set to +30°, the phase difference is controlled, for each control cycle, so as to be for example +27°, 29°, 32°, 28°, . . . . In this example, the control is switched to the driving in the CCW direction at a point of time when the rotation position of the contact body 132 reaches 360 deg. Thereafter, the feedback control is performed with the phase difference of the third quadrant obtained by the phase shifting. For example, assuming that the average value of the phase differences is −150°, the phase difference is controlled, for each control cycle, so as to be for example −152°, −149°, −146°, −153°, . . . .

The drive control in the present embodiment is characterized in that the phase difference obtained through the phase shift corresponding to the drive direction is not a fixed value but is successively changed according to the feedback control amount and the maximum displacement positions and the minimum displacement position of the vibration are switched with each other according to the selection of the quadrant through the phase shift.

Figure 9A:
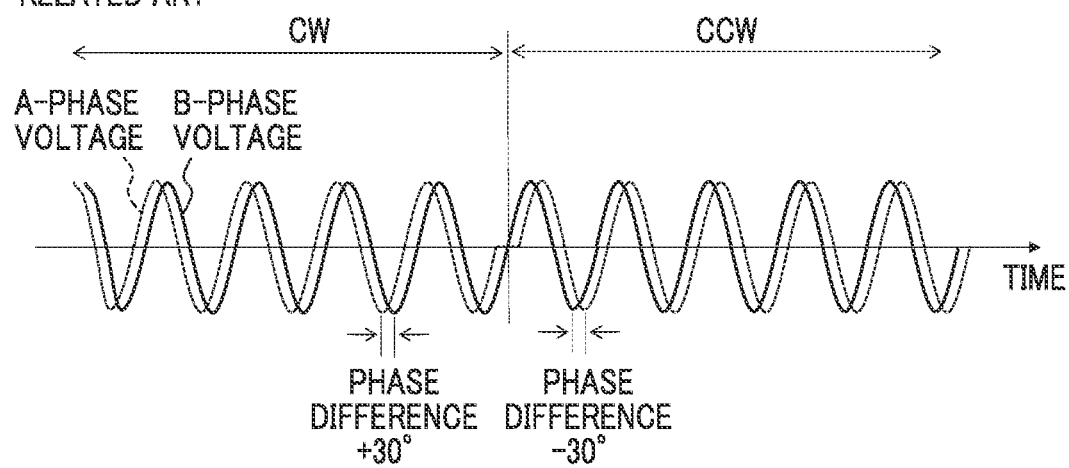
FIGS. 9A and 9B are schematic diagrams showing scenes in which waveforms of two-phase alternating current voltages during low-speed driving are switched depending on the drive direction.
Figure 9B:
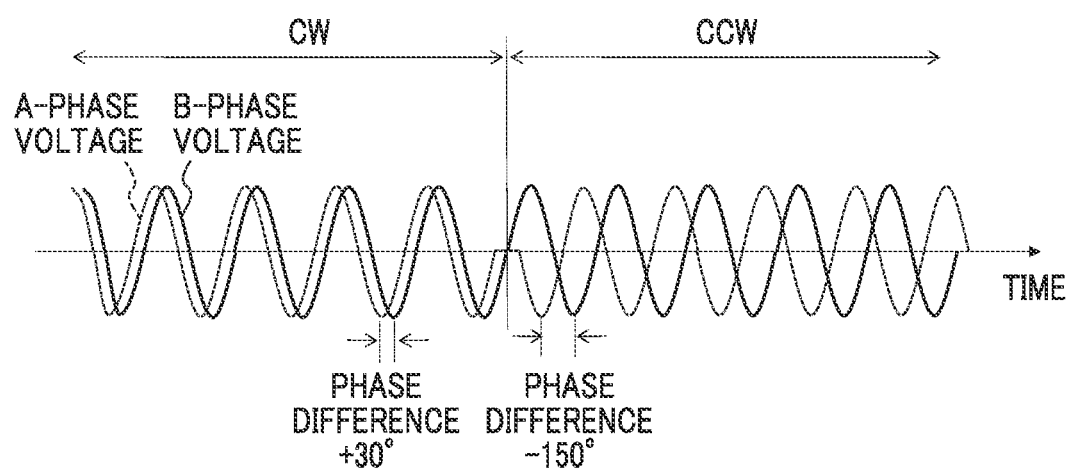

FIGS. 9A and 9B are schematic diagrams showing scenes in which waveforms of the two-phase alternating current voltages during the low-speed driving of the vibration type actuator 13 performed by the drive control device 12 are switched depending on the drive direction. FIG. 9A shows an example of the related art, and FIG. 9B shows an example according to the present invention. An A-phase voltage signal (dashed line) and a B-phase voltage signal (solid signal) when the vibration type actuator is driven with the phase difference of +30° for the CW direction and with the phase difference of −150° for the CCW direction are shown in FIG. 9B as an example.

When the drive direction is suddenly reversed as in the examples of FIGS. 9A and 9B, the vibration excited in the vibrator 131 is likely to be unstable at a timing when the phase differences are switched, and thus, there is a concern that driving sound will become loud. Thus, it is desirable that the continuous phase shift is avoided during the driving, and it is desirable that stop regions are provided before and after the phase shift (the phase shift is performed within the stop regions).

Figure 10:
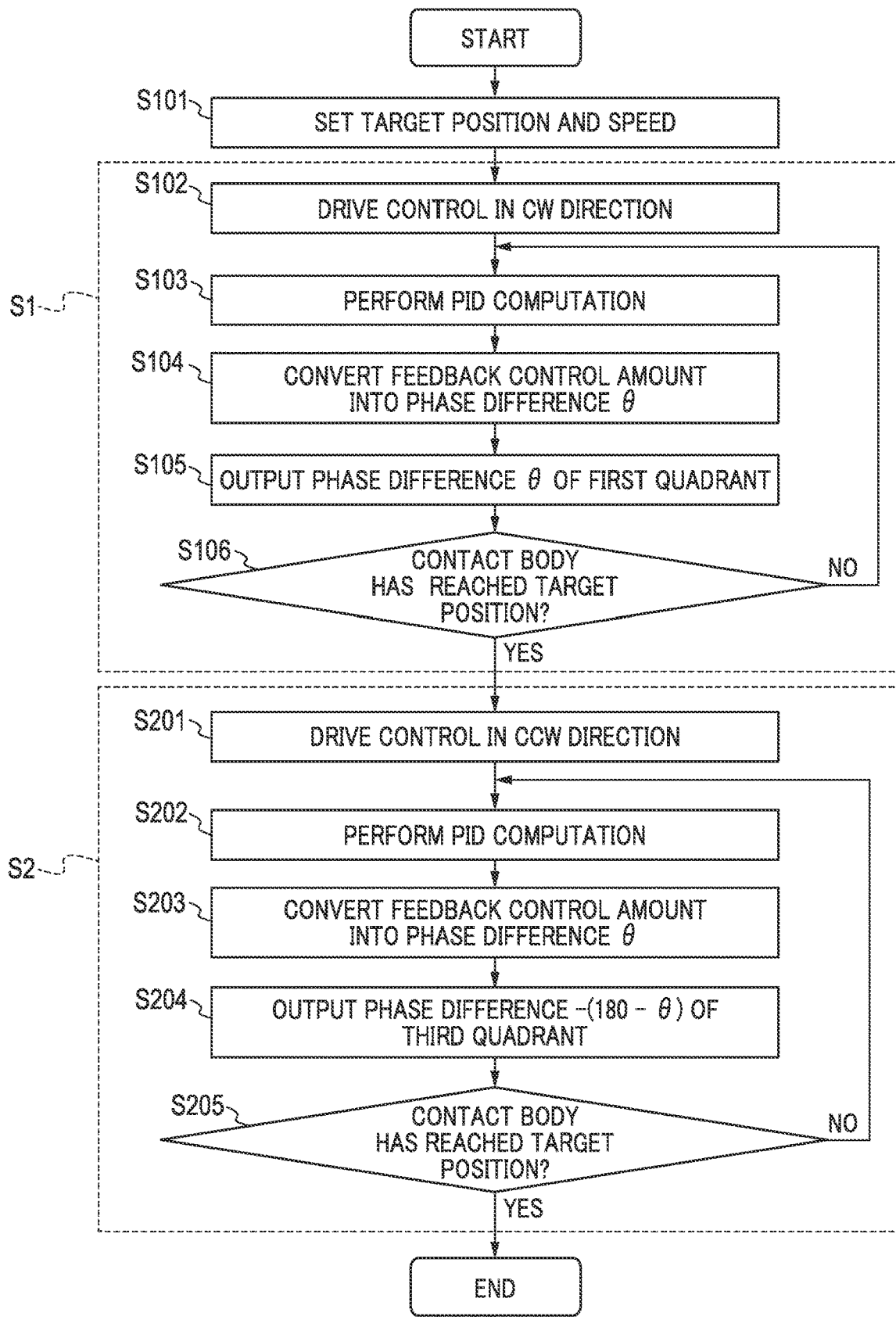
FIG. 10 is a flowchart for describing a drive control method for the vibration type actuator.

FIG. 10 is a flowchart for describing the drive control method for the vibration type actuator 13 performed by the drive control device 12. The control unit 10 (a CPU constituting the control unit 10) executes a predetermined program, and thus, processes (steps) indicated by S numbers in FIG. 10 are realized by controlling the operations of the parts of the vibration type drive device 15.

In step S101, the control unit 10 sets a target position and speed of the contact body 132. Subsequently, it is assumed in this example that the control unit 10 performs a reciprocating operation by repeating the driving in the CW direction (S1) and the driving in the CCW direction (S2). S1 and S2 are performed in a random order. One of the control of S1 and the control of S2 may be continuously performed according to an operation required by the drive mechanism 16. That is, the flow of S1 is used in the rotation drive of the contact body 132 in the CW direction, and the flow of S2 is used in the rotation drive of the contact body in the CCW direction.

Processes of S1 will be described in detail. In step S102, the control unit 10 turns on drive pulses, and applies the alternating current voltages from the drive portion 11 to the piezoelectric element of the vibrator 131 constituting the vibration type actuator 13. Accordingly, the driving of the contact body 132 in the CW direction is started. In step S103, the control unit 10 performs the PID computation by using the deviation of the position or speed. In step S104, the control unit 10 obtains the phase difference $\theta$ from the feedback control amount. In step S105, the control unit 10 outputs the phase difference $\theta s = \theta$ (first quadrant) to the drive portion 11. In step S106, the control unit 10 determines whether or not the contact body 132 has reached the target position. When it is determined that the contact body 132 has reached the target position (YES in step S106), the control unit 10 proceeds the process to S2 (step S201) after a predetermined stop time elapses, and when it is determined that the contact body 132 has not reached the target position (NO in step S106), the control unit 10 returns the process to step S103.

Next, processes of S2 will be described in detail. In step S201, the control unit 10 turns on the drive pulses, and applies the alternating current voltages from the drive portion 11 to the vibration type actuator 13 (the piezoelectric element of the vibrator 131). Accordingly, the driving of the contact body 132 in the CCW direction is started. In step S202, the control unit 10 performs the PID computation by using the deviation of the position or speed. In step S203, the control unit 10 obtains the phase difference $\theta$ from the feedback control amount. In step S204, the control unit 10 outputs the phase difference $\theta s = -(180 - \theta)$ (third quadrant) to the drive portion 11. In step S205, the control unit 10 determines whether or not the contact body 132 has reached the target position. When it is determined that the contact body 132 has reached the target position (YES in step S205), the control unit 10 ends the present process after a predetermined stop time elapses, and when it is determined that the contact body 132 has not reached the target position (NO in step S205), the control unit 10 returns the process to step S202.

Figure 11A:
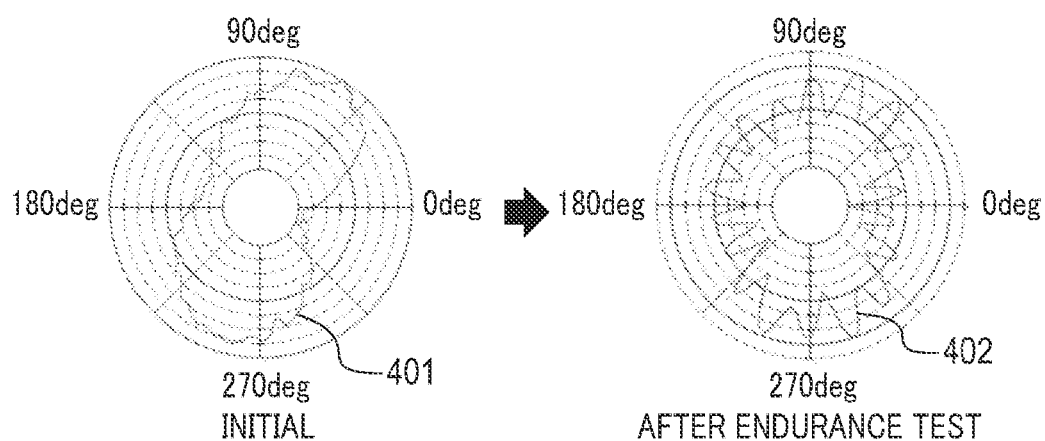
FIGS. 11A and 11B are diagrams for describing advantageous effects of control performed according to the flowchart of FIG. 10.
Figure 11B:
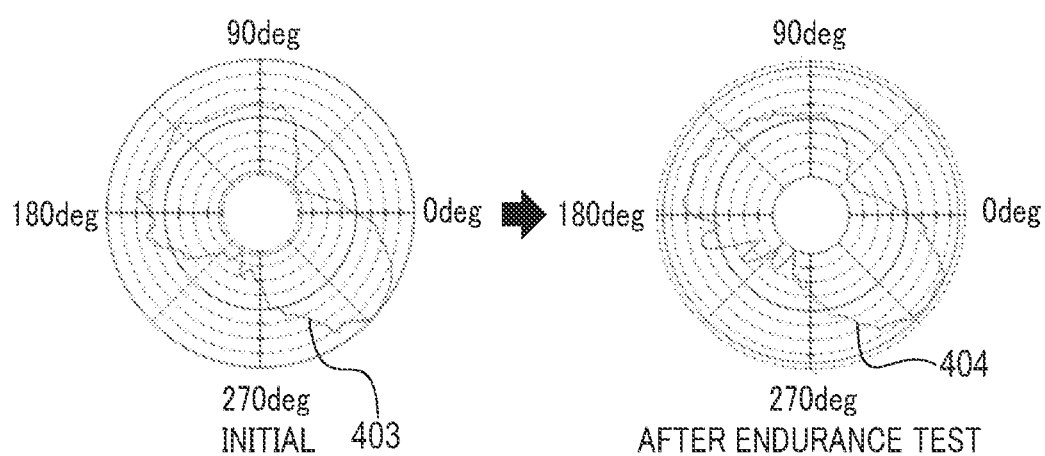

FIGS. 11A and 11B are diagrams for describing advantageous effects of the invention attained when the drive control of the vibration type actuator is performed according to the flowchart of FIG. 10. FIGS. 11A and 11B show results obtained by inspecting a change of a surface shape of a frictional contact part of the vibrator 131 before and after an endurance test, and show results obtained by measuring the flatness of the frictional contact part at positions of 0 deg to 360 deg in a circumferential direction. The endurance test is conducted by performing a reciprocating operation of one rotation at 1 deg/s for about 24 hours.

FIG. 11A shows results when a drive control method (FIG. 6A) of the related art is used. After the endurance test, a change in a frictional contact surface on which 18 protrusions are formed is recognized from changes of shapes of contour lines 401 and 402 obtained by connecting predetermined height positions (about 2.1 μm) from a reference surface, and thus a remarkable decline in flatness is recognized. In this example, the vibrator 131 is driven by the traveling waves using a ninth mode. In the standing wave in this case, the maximum displacement positions of the vibration amplitudes theoretically occur at 18 positions in one cycle. Thus, it can be said that the results of FIG. 11A match theoretical values. Speed characteristics, torque performance, and torque efficiency were greatly reduced after the endurance test of the vibration type actuator.

FIG. 11B show results when the drive control method of FIG. 6B is used according to the flowchart of FIG. 10. When contour lines 403 and 404 that connect predetermined height positions (about 1.2 μm) from a reference surface are compared, it can be seen that a significant shape change is not observed and favorable flatness is maintained even after the endurance test. It should be noted that speed characteristics, torque performance, and torque efficiency equivalent to those before the endurance test were obtained after the endurance test of the vibration type actuator.

Figure 12B:
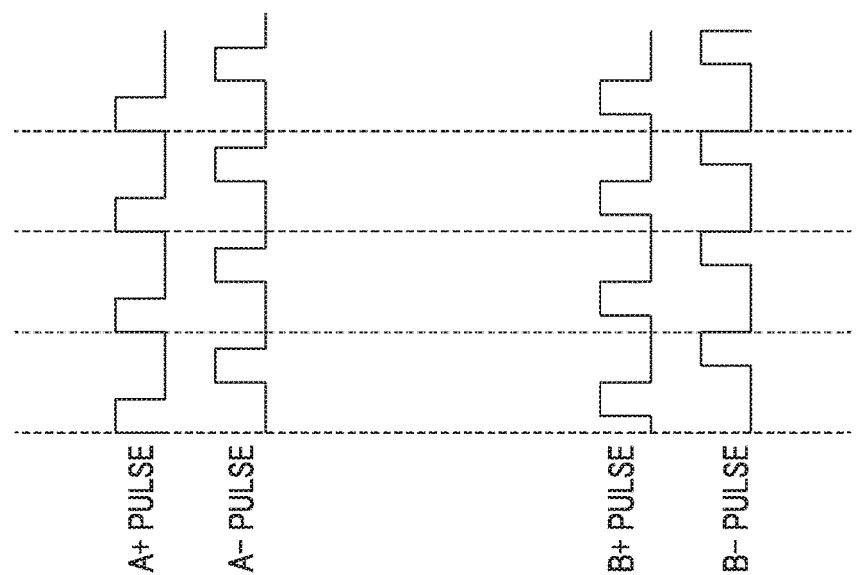
FIGS. 12A and 12B are a circuit diagram of a drive portion and a diagram for describing pulse signals, respectively.
Figure 12A:
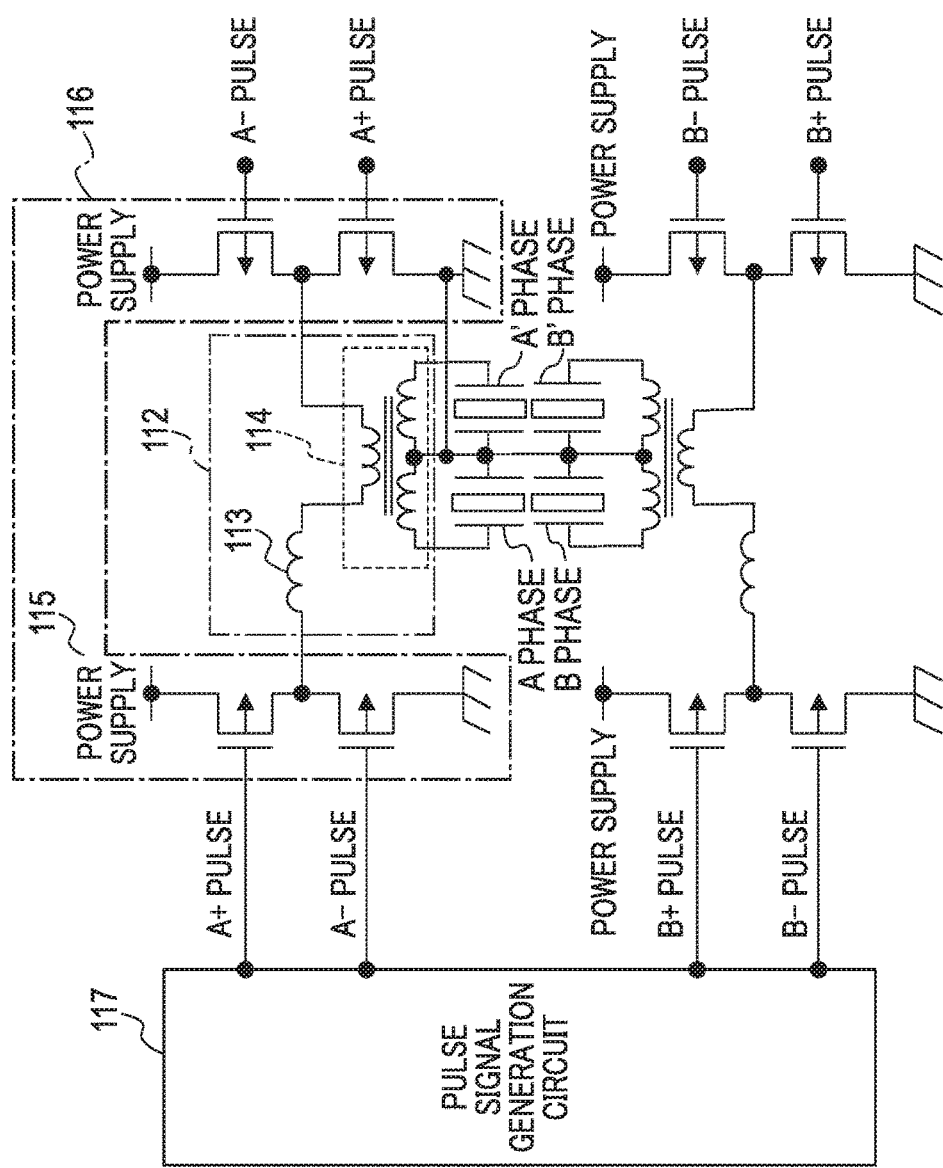

Next, a configuration of the drive portion 11 suitable to perform the drive control method according to the first embodiment will be described. FIG. 12A is a circuit diagram of the drive portion 11. The alternating current signal generation unit 111 of the drive portion 11 includes a pulse signal generation circuit 117 that generates pulse signals and a switching circuit 116 (H bridge circuit) that is switched by the pulse signals from the pulse signal generation circuit 117. FIG. 12B is a diagram for describing the pulse signals generated by the pulse signal generation circuit 117. The pulse signal generation circuit 117 outputs, to the switching circuit 116, an A+ pulse and an A− pulse of which a phase is 180° different from the A+ pulse according to a control signal from the control unit 10.

The switching circuit 116 generates the alternating current voltages by switching element switching (performing on or off control on) a voltage of a direct current power supply 115 according to the pulse signals from the pulse signal generation circuit 117. At this time, a pulse width (duty) of the pulse signal is adjusted according to the control signal such that a desired amplitude of alternating current voltage is obtained through PWM (pulse width modulation) control. The alternating current voltages output from the switching circuit 116 are boosted to desired voltages by the booster circuit 112 constituted by a coil 113 and a transformer 114. The alternating voltages of which a waveform is converted from a square waveform to a SIN waveform by a filter effect are output from the booster circuit 112, and are applied to the piezoelectric element of the vibrator 131.

The alternating current voltages corresponding to one phase which are generated by using the A+ pulse and the A− pulse have been described. Since the alternating current voltages corresponding to the other one phase are similarly generated by a B+ pulse output from the pulse signal generation circuit 117 and a B− pulse of which the phase is 180° different from the B+ pulse, the description thereof will be omitted. It should be noted that the phase difference $\theta$ obtained through the feedback control in the drive control device 12 indicates a phase difference between the A+ pulse and the B+ pulse. FIG. 12B shows the A+ pulse and the B+ pulse of which the phases are shifted by 90°.

According to the present invention, driving is performed while switching the maximum displacement positions and the minimum displacement positions of the traveling waves with each other by converting the feedback control amount based on the position or speed into the phase differences of the plurality of quadrants and switching the quadrants. Accordingly, it is possible to restrain the uneven wear from being caused in the vibrator, and thus, it is possible to restrain the performance of the vibration type actuator from being declined over time. Therefore, it is possible to maintain the vibration type actuator at high drive performance over a long period of time, and it is possible to maintain favorable controllability.

Figure 13A:
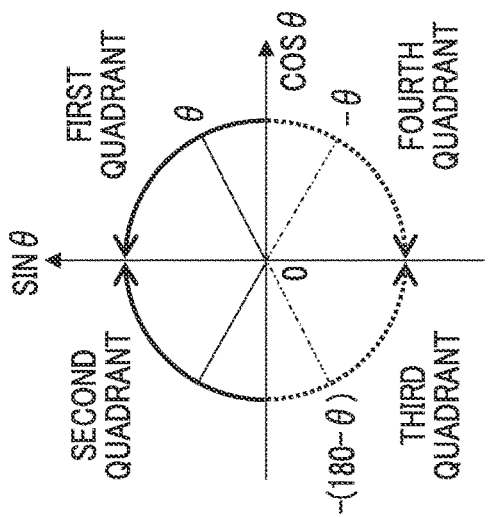
FIGS. 13A and 13B are diagrams for describing phase difference control according to a second embodiment.
Figure 13B:
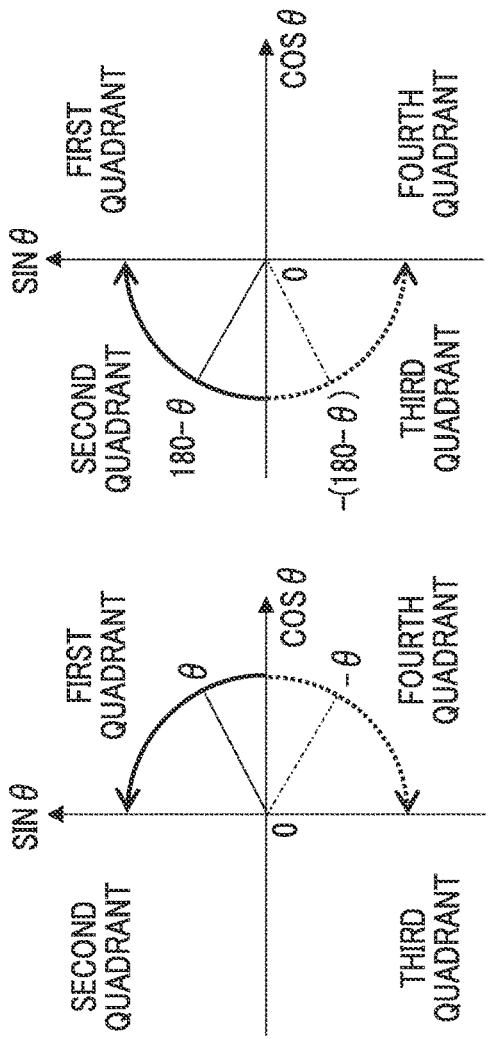

Next, a drive control method according to a second embodiment performed by the drive control device 12 will be described. Operations of the phase difference quadrant change unit 105 are different between the first embodiment and the second embodiment. FIGS. 13A and 13B are diagrams for describing phase difference control (an operation of the phase difference quadrant change unit 105) according to the second embodiment by using the same coordinates as those of FIGS. 6A to 6C. FIG. 13A is a schematic diagram showing the drive control method using all the quadrants from the first quadrant to the fourth quadrant. In the drive control method according to the second embodiment, the normal mode of the first quadrant or the phase shift mode of the second quadrant is used in the rotation drive in the CW direction, and the phase shift mode of the third quadrant or the normal mode of the fourth quadrant is used in the rotation drive in the CCW direction.

FIG. 13B is a schematic diagram showing control for switching between the normal mode and the phase shift mode. The diagram for describing the normal mode is the same as the diagram of FIG. 6A. The phase difference θs=θ (first quadrant) is used in the rotation drive in the CW direction, and the phase difference θs=−θ (fourth quadrant) is used in the rotation drive in the CCW direction. In the phase shift mode, the phase difference θs=180−θ (second quadrant) obtained by the phase shifting is used in the rotation drive in the CW direction, and the phase difference θs=−(180−θ) (third quadrant) obtained by the phase shifting is also used in the rotation drive in the CCW direction. It should be noted that the maximum displacement positions and the minimum displacement positions of the vibration amplitudes are not changed in the normal mode, and the maximum displacement positions and the minimum displacement positions of the vibration amplitudes are not changed also in the phase shift mode. The maximum displacement positions and the minimum displacement positions of the vibration amplitudes are switched between the normal mode and the phase shift mode with each other.

Accordingly, the uneven wear of the vibrator 131 can be restrained by switching between the normal mode and the phase shift mode to switch the maximum displacement positions and the minimum displacement positions with each other, at appropriate timings, such that the frequency of driving in the normal mode and the frequency of driving in the phase shift mode are equal to each other. The switching between the driving in the normal mode and the driving in the phase shift mode may be performed at an on or off timing of the driving, or may be performed based on a drive direction, a drive distance (rotation angle), a drive time, or the number of times of driving.

FIG. 7C described above shows the phase difference control region in the normal mode and FIG. 7D described above shows the phase difference control region in the phase shift mode. The drive control method according to the second embodiment is characterized in that the methods for outputting the phase difference θ in the phase difference control region are switched between the normal mode and the phase shift mode.

FIGS. 14A and 14B are graphs showing relationships between the rotation position, the phase difference, and the time until the contact body 132 reaches the target position in the drive control method according to the second embodiment. In these examples, the normal mode is used in the driving in the CW direction, and the phase shift mode is used in the driving in the CCW direction.

FIG. 14A shows a time change of the phase difference θ which is changed according to the feedback control amount of the command value, the rotation position, or the deviation e in the normal mode. In this example, the present drive control will be described focusing on times t1, t2, and t3. After activation through the phase difference control, the phase difference is fixed (in this example, substantially +90°), the frequency control is subsequently performed, and the time reaches time t1. In a period from time t1 to time t2, the control is performed with the phase difference θs=θ (first quadrant). A period from time t2 to time t3 is a period in which a return operation after overshooting is performed. A sign of the phase difference during the return operation is minus (−), that is, the control is performed with the phase difference θs=−θ (fourth quadrant). At time t3, the command value reaches the target position, and the control is performed again with the phase difference θs=θ (first quadrant).

FIG. 14B shows a time change of the phase difference θ which is changed according to the feedback control amount of the command value, the rotation position, or the deviation e in the phase shift mode. Also in this example, the present drive control will be described focusing on time t1, t2, and t3. After the activation through the phase difference control, the phase difference is fixed (in this example, substantially)−90°, the frequency control is subsequently performed, and the time reaches time t1. In a period from time t1 to time t2, the control is performed with the phase difference θs=−(180−θ) (third quadrant). A period from time t2 to time t3 is a period in which a return operation after overshooting is performed. During the return operation, the control is performed with the phase difference θs=180−θ (second quadrant). At time t3, the command value reaches the target position, and the control is performed again with the phase difference θs=−(180−θ) (third quadrant).

As stated above, in the second embodiment, the control is performed by using the phase difference θ which is changed based on the feedback control amount and combining the normal mode using the phase differences of the first quadrant and the fourth quadrant and the phase shift mode using the phase differences of the second quadrant and the third quadrant through the phase difference shift. The maximum displacement positions and the minimum displacement positions of the amplitudes of the traveling waves caused in the vibrator are switched with each other, and thus, it is possible to restrain the uneven wear in the vibrator from being caused. As a result, it is possible to maintain the vibration type actuator at high drive performance over a long period of time, and it is possible to maintain favorable controllability.

Figure 15A:
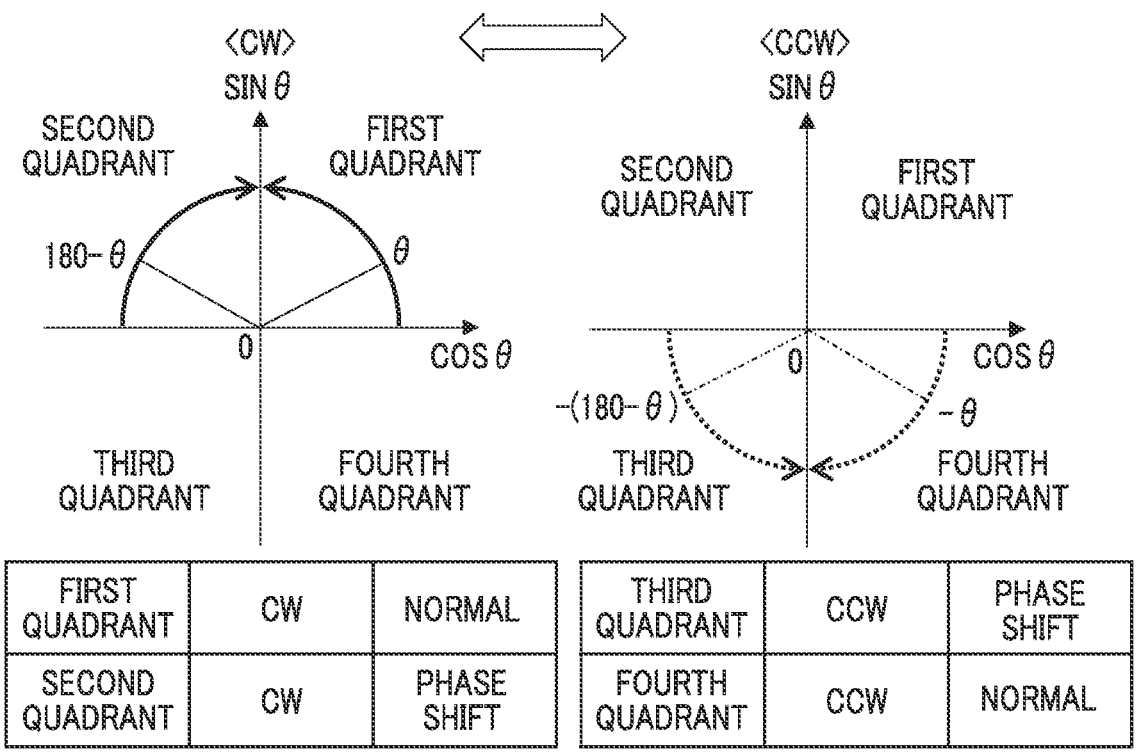
FIGS. 15A and 15B are diagrams for describing phase difference control according to a third embodiment.
Figure 15B:
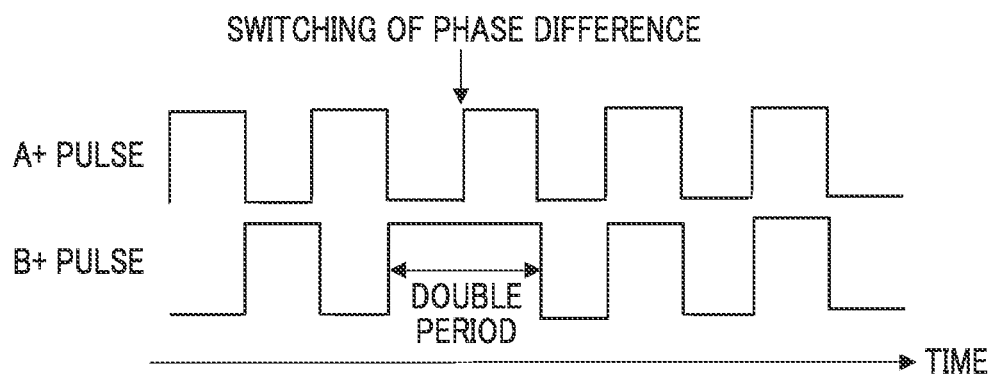

Next, a drive control method according to a third embodiment performed by the drive control device 12 will be described. Operations of the phase difference quadrant change unit 105 are different between the first and second embodiments and the third embodiment. FIGS. 15A and 15B are diagrams for describing phase difference control (an operation of the phase difference quadrant change unit 105) according to the third embodiment. In the phase difference control according to the third embodiment, a normal phase difference and a phase difference obtained by shifting the phase difference (the normal mode and the phase shift mode) are switched during the driving in the same direction.

FIG. 15A is a schematic diagram showing control for switching between the rotation drive in the CW direction and the rotation drive in the CCW direction in a similar way as in FIGS. 6A to 6C and FIGS. 13A and 13B. The phase difference θs=θ (first quadrant) and the phase difference θs=(180−θ) (second quadrant) are used in the rotation drive in the CW direction. Thus, the maximum displacement positions and the minimum displacement positions are switched with each other during the driving. Meanwhile, the phase difference θs=−(180−θ) (third quadrant) and the phase difference θs=−θ (fourth quadrant) are used in the rotation drive in the CCW direction. Also in this case, the maximum displacement positions and the minimum displacement positions of the vibration amplitudes are switched with each other during the driving.

Examples of a specific method for switching the phase differences θs during the driving include a method for switching between the phase difference θ of the first quadrant and the phase difference (180−θ) of the second quadrant each time when a predetermined drive time elapses, in a case where the driving in the CW direction is being performed. The predetermined drive time in this case may be changed according to the speed. The phase differences may be switched each time when the contact body 132 is driven by a predetermined rotation angle. For example, there is a method for switching the phase differences when the position sensor detects that the contact body reaches half the target position. Alternatively, the phase differences may be switched at a timing when a predetermined drive time elapses. For example, there is a method for switching the phase differences when a timer detects half of a predicted arrival time to the target position of the contact body.

In the case of such a drive control method, since the drive direction is not changed but the maximum displacement positions and the minimum displacement positions of the vibration are switched with each other during the driving, there is a concern that the drive state will be unstable at a timing when the maximum displacement positions and the minimum displacement positions are switched with each other. In FIG. 15B, waveforms of the A+ pulse and the B+ pulse when the phase is switched from 180° to 0° during the driving are shown. As shown in FIG. 15B, a pulse component having a double period is generated at a timing when the phase differences (quadrants) are switched. As a result, an alternating current voltage having a frequency different from the drive frequency is instantaneously applied to the vibration type actuator 13. Accordingly, there are concerns that the driving sound will increase or abnormal current will be generated. Thus, in the drive control method according to the third embodiment, it is desirable that the number of times of switching between the normal phase difference and the phase difference obtained by phase shifting during the driving is less.

Figure 16A:
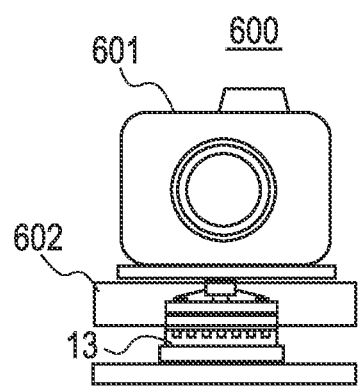
FIGS. 16A and 16B are diagrams showing an example of an apparatus comprising the vibration type drive device.
Figure 16B:
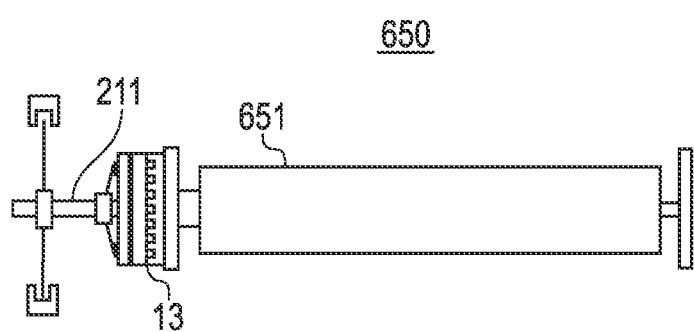

Next, an example of an apparatus including the vibration type drive device will be described. FIG. 16 is a diagram showing a schematic configuration of an image pickup apparatus 600 including the vibration type drive device 15. In the image pickup apparatus 600, shooting or filming can be performed by driving a tripod head 602 to be rotated by the vibration type actuator 13 and turning a camera 601 fixed to the tripod head 602 such that a shooting direction is a predetermined direction. FIG. 16B is a diagram showing a partial structure of a rotation drive device 650 in a multi-function peripheral (MFP). In this example, it is possible to drive a transfer drum 651 to be rotated by coupling the transfer drum 651 to the output shaft 211 of the vibration type actuator 13.

The vibration type drive device 15 according to the present embodiment is not limited to be applied to these examples, and can be applied to various apparatuses comprising a member requiring positioning or movement by the driving of the vibration type actuator 13. For example, in the image pickup apparatus, the vibration type drive device can be applied to a mechanism that drives a focus lens or a zoom lens coupled to the contact body in an optical axis direction. The vibration type drive device can be applied to a drive mechanism of a joint part in an industrial or medical articulated robot. In particular, the present invention is suitable for an apparatus requiring the drive control of the vibration type actuator requiring the low-speed driving.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-182377, filed Sep. 27, 2018, which is hereby incorporated by reference herein in its entirety.

What is claimed is:

1. A vibration type drive device, comprising:
 a vibration type actuator that comprises a vibrator having an electrical-mechanical energy conversion element and a contact body which move relative to each other, and a detection unit configured to detect a relative position or a relative speed between the vibrator and the contact body; and
 a drive control device configured to control driving of the vibration type actuator, wherein the drive control device comprises:
  a drive portion configured to apply two-phase alternating current voltages to the electrical-mechanical energy conversion element; and
  an output unit configured to convert a control amount of feedback control based on the relative position or the relative speed into a phase difference between the two-phase alternating current voltages, and configured to output the phase difference to the drive portion by using, for driving of the relative movement in a first direction, a phase difference of a first quadrant or a second quadrant in a coordinate system, and by using, for driving in a second direction opposite to the first direction, a phase difference of a third quadrant or a fourth quadrant in the coordinate system, wherein the phase difference is represented by $\theta$, and $\sin\theta$ corresponds to a vertical axis and $\cos\theta$ corresponds to a horizontal axis in the coordinate system, and
  wherein the drive control device is configured to perform driving while switching maximum displacement positions and minimum displacement positions of traveling waves with each other by converting the feedback control amount based on the position or speed into the phase differences of the first quadrant and the second quadrant and switching the first quadrant and the second quadrant.

2. The vibration type drive device according to claim 1, wherein
  maximum displacement positions and minimum displacement positions of vibration amplitudes caused in the vibrator are not changed between the phase difference of the first quadrant and the phase difference of the fourth quadrant,
  the maximum displacement positions and the minimum displacement positions of the vibration amplitudes caused in the vibrator are not changed between the phase difference of the second quadrant and the phase difference of the third quadrant, and
  the maximum displacement positions and the minimum displacement positions of the vibration amplitudes caused in the vibrator are switched with each other between the phase difference of the first quadrant and the phase difference of the second quadrant.

3. The vibration type drive device according to claim 1, wherein
  the phase difference of the first quadrant is $\theta$, the phase difference of the second quadrant is $(180°-\theta)$, the phase difference of the third quadrant is $-(180°-\theta)$, and the phase difference of the fourth quadrant is $-\theta$.

4. The vibration type drive device according to claim 1, wherein
  the output unit uses the phase difference of the first quadrant for the driving in the first direction, and uses the phase difference of the third quadrant for the driving in the second direction.

5. The vibration type drive device according to claim 1, wherein
  the output unit uses the phase difference of the second quadrant for the driving in the first direction, and uses the phase difference of the fourth quadrant for the driving in the second direction.

6. The vibration type drive device according to claim 1, wherein
  the output unit switches between a mode in which the phase difference of the first quadrant is used for the driving in the first direction and the phase difference of the fourth quadrant is used for the driving in the second direction and a mode in which the phase difference of the second quadrant is used for the driving in the first direction and the phase difference of the third quadrant is used for the driving in the second direction.

7. The vibration type drive device according to claim 1, wherein
  the output unit switches between the phase difference of the first quadrant and the phase difference of the second quadrant during the driving in the first direction and switches between the phase difference of the third quadrant and the phase difference of the fourth quadrant during the driving in the second direction, based on a drive time of the vibration type actuator or a relative drive distance between the vibrator and the contact body.

8. The vibration type drive device according to claim 1, wherein
  the drive control device includes a control unit configured to perform phase difference control for operating the phase difference in a region in which an absolute value of the control amount is less than a predetermined value and to perform frequency control for operating a frequency of the alternating current voltage in a region in which the absolute value of the control amount is greater than the predetermined value.

9. The vibration type drive device according to claim 1, wherein
  the phase difference of the first quadrant is set within a range of 0° to +90°.

10. An apparatus comprising:
  the vibration type drive device according to claim 1;
  a member that is positioned by driving of a vibration type actuator included in the vibration type drive device.

11. A drive control device of a vibration type actuator in which a vibrator including an electrical-mechanical energy conversion element and a contact body move relative to each other, the drive control device comprising:
  a drive portion configured to apply two-phase alternating current voltages to the electrical-mechanical energy conversion element; and
  an output unit configured to convert a control amount of feedback control based on a relative position or a relative speed, which is detected by a detection unit configured to detect the relative position or the relative speed between the vibrator and the contact body, into a phase difference between the two-phase alternating current voltages, and configured to output the phase difference to the drive portion by using, for driving of the relative movement in a first direction, a phase difference of a first quadrant or a second quadrant in a coordinate system, and by using, for driving in a second direction opposite to the first direction, a phase difference of a third quadrant or a fourth quadrant in the coordinate system, wherein the phase difference is represented by $\theta$, and $\sin\theta$ corresponds to a vertical axis and $\cos\theta$ corresponds to a horizontal axis in the coordinate system,
  wherein the drive control device is configured to perform driving while switching maximum displacement positions and minimum displacement positions of traveling waves with each other by converting the feedback control amount based on the position or speed into the phase differences of the first quadrant and the second quadrant and switching the first quadrant and the second quadrant.

12. A drive control method for a vibration type actuator in which a vibrator including an electrical-mechanical energy conversion element and a contact body move relative to each other, the method comprising:
  detecting a relative position or a relative speed between the vibrator and the contact body;
  converting a control amount of feedback control based on the relative position or the relative speed into a phase difference between two-phase alternating current voltages to be applied to the electrical-mechanical energy conversion element;
  using, for driving of the relative movement in a first direction, a phase difference of a first quadrant or a second quadrant in a coordinate system, and using, for driving in a second direction opposite to the first direction, a phase difference of a third quadrant or a fourth quadrant in the coordinate system, wherein the phase difference is represented by $\theta$, and SIN $\theta$ corresponds to a vertical axis and COS $\theta$ corresponds to a horizontal axis in the coordinate system; and
  performing driving while switching maximum displacement positions and minimum displacement positions of traveling waves with each other by converting the feedback control amount based on the position or speed into the phase differences of the first quadrant and the second quadrant and switching the first quadrant and the second quadrant.

* * * * *